(12) United States Patent
Port-Robach et al.

(10) Patent No.: US 8,146,858 B2
(45) Date of Patent: Apr. 3, 2012

(54) NO-BACK DEVICE HAVING MALFUNCTION DETECTION

(75) Inventors: Isabelle Port-Robach, Deuil la Barre (FR); Raphael Medina, Soisy sous Montmorency (FR)

(73) Assignee: Goodrich Actuation Systems SAS, Buc (FR)

( * ) Notice: Subject to any disclaimer, the term of this patent is extended or adjusted under 35 U.S.C. 154(b) by 1384 days.

(21) Appl. No.: 11/662,436

(22) PCT Filed: Sep. 8, 2005

(86) PCT No.: PCT/EP2005/054469
§ 371 (c)(1),
(2), (4) Date: Mar. 9, 2007

(87) PCT Pub. No.: WO2006/029988
PCT Pub. Date: Mar. 23, 2006

(65) Prior Publication Data
US 2008/0000730 A1    Jan. 3, 2008

(30) Foreign Application Priority Data
Sep. 9, 2004 (FR) .................................... 04 09562

(51) Int. Cl.
*B64C 13/00*   (2006.01)
*F16H 57/10*   (2006.01)
*F16D 55/02*   (2006.01)
*B60T 8/88*    (2006.01)

(52) U.S. Cl. .................... 244/99.9; 192/223.1; 188/71.2; 303/122

(58) Field of Classification Search ................. 244/99.2, 244/99.3, 99.9; 73/162; 324/207.11, 207.12, 324/207.22, 207.25; 303/122; 192/223.1
See application file for complete search history.

(56) References Cited

U.S. PATENT DOCUMENTS

| | | | |
|---|---|---|---|
| 4,256,277 A | | 3/1981 | Embree |
| 4,762,205 A | | 8/1988 | Ortman |
| 5,582,390 A | | 12/1996 | Russ |
| 5,814,985 A | * | 9/1998 | Oudet ........................ 324/207.2 |
| 6,191,576 B1 | * | 2/2001 | Ricks et al. ................ 324/207.2 |
| 6,291,989 B1 | * | 9/2001 | Schroeder ................ 324/207.21 |
| 6,313,625 B1 | * | 11/2001 | Varady et al. ............ 324/207.25 |
| 6,445,176 B1 | * | 9/2002 | Wallrafen ..................... 324/166 |
| 6,483,293 B1 | * | 11/2002 | Chen et al. ................ 324/207.12 |
| 6,580,234 B2 | * | 6/2003 | Capewell ........................... 318/3 |
| 2003/0062890 A1 | * | 4/2003 | Tokumoto ................ 324/207.25 |

FOREIGN PATENT DOCUMENTS

| | | |
|---|---|---|
| EP | 1 378 685 A2 | 1/2004 |
| SU | 805099 | 2/1981 |

* cited by examiner

*Primary Examiner* — Timothy D Collins
*Assistant Examiner* — Jamie S Stehle
(74) *Attorney, Agent, or Firm* — Pauley Peterson & Erickson

(57) ABSTRACT

The invention relates to a no-back device for a mobile element actuating device including a screw shaft having first and second braking means each comprising a ratchet wheel. These ratchet wheels are mounted opposite one another so that the first braking means are adapted to resist an unwanted movement of the screw shaft in a first direction, and the second braking means are adapted to resist an unwanted movement of the screw shaft in an opposite direction. The no-back device also includes means for detecting the state of the rotation of the ratchet wheels and indicating means for furnishing, according to the state of the rotation of the wheels, an indication concerning the operating state of the no-back device.

8 Claims, 4 Drawing Sheets

FIG_1

Prior Art

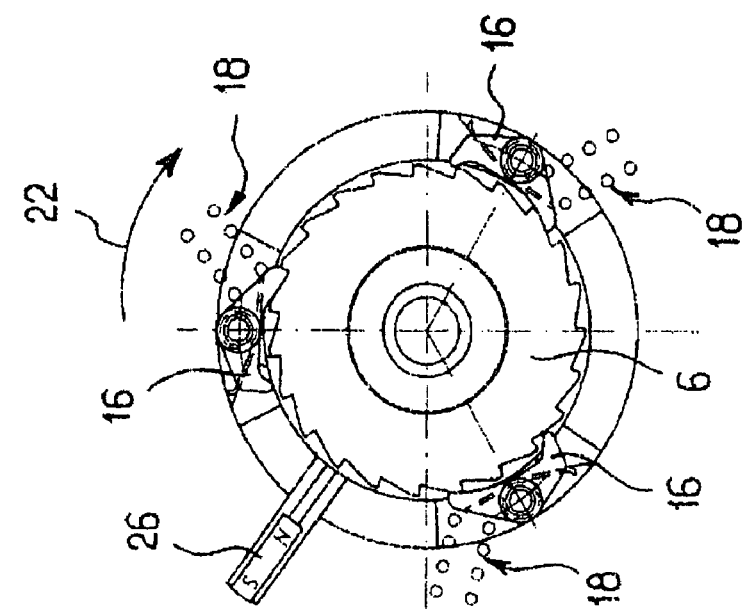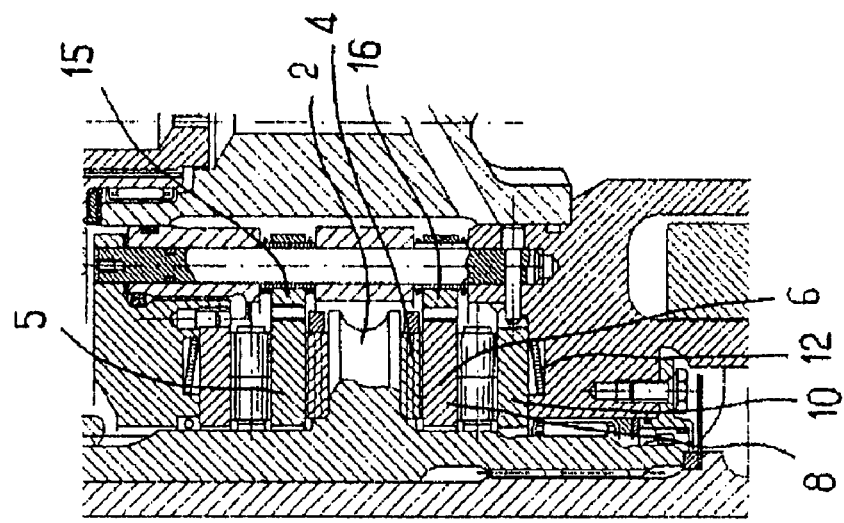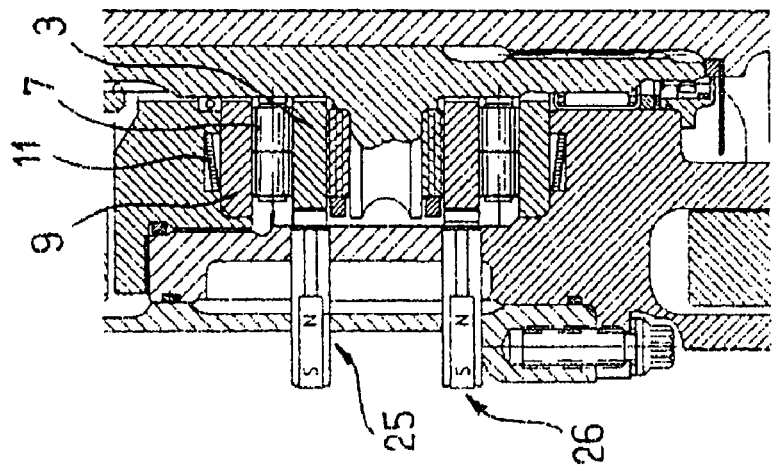
FIG.4

NO-BACK DEVICE HAVING MALFUNCTION DETECTION

BACKGROUND OF THE INVENTION

1. Field of the Invention

The invention relates generally to a non-return braking arrangement for a device for the operation of a mobile device, and in a particular embodiment to control the flight of an aircraft.

The invention finds a particularly advantageous application in the context of the actuation of an element for adjusting the horizontal plane on an aircraft (the elevator aileron), though other applications are also possible.

2. Discussion of Related Art

Such a non-return device is more commonly known as a "no-back" device.

The actuation of a mobile element on an aircraft can be effected by means of a worm-screw actuating system generally with two attachments, a first attachment known as the aircraft attachment by which the actuating screw is associated with the structure of the aircraft, and a second attachment known as the structure attachment by which the actuating screw is attached by a nut to the mobile element to be actuated.

Generally, the role of a no-back device is to eliminate the effect of any force which, acting on the nut, tends to oppose or to favor the normal rotation of the actuating screw.

If a load were allowed to act against the input torque applied to the actuating screw, it would then be necessary to apply an even larger input torque requiring, in particular, a larger and heavier input motor.

Similarly, an assisting torque acting on the input torque applied to the actuating screw would contribute energy but would also cause difficulties regarding speed regulation as well as in maintaining the position of the actuating device.

A no-back device is used in particular to prevent the actuating screw from starting to rotate under the effect of an axial aerodynamic load of the traction or compression type, acting on the nut. Any force applied to the actuating screw, whose effect is to assist the input torque or to oppose this torque, is then eliminated.

A more detailed description of the operation of a conventional no-back device is provided below with particular reference to FIGS. 1 to 3.

A failure of a no-back device is potentially dangerous, since the shaft of the actuating screw could then be driven by the aerodynamic forces acting on the mobile element to be actuated. The mobile element would then not be held in the desired position and could flutter, rendering the aircraft unstable.

Also proposed was an actuating device in which the function of the no-back device is redundant and can be overridden, in the event of failure of the latter, by a secondary sprocket chain which holds the position of the nut by means of a control loop.

Such a device, though affording security, nevertheless gives rise to the risk that an operation that depends only on the secondary sprocket chain, after failure of the primary no-back function, would prevent the failure from being detected.

The actuating device is then no longer providing its additional level of security, and is robbed of its original purpose.

In addition, a simple break in the secondary sprocket chain would result in the loss of the attachment between the structure of the aircraft and the mobile element to be actuated, thus leading to a catastrophic situation.

There is therefore a requirement that a failure (of the primary function) of a no-back device be detected, in particular in order to avoid any operation, that depends on the secondary chain only, according to a dormant failure mode.

SUMMARY OF THE INVENTION

An aim of the invention is to meet this requirement. According to a first aspect, there is proposed a no-back device for an actuating device of a mobile element, which includes a screw type shaft, accompanied by first and second brakes or braking means, each of which has a ratchet wheel, where these ratchet wheels are mounted in opposition to each other so that the first braking means are adapted to resist an unwanted movement of the screw type shaft in a first direction, and the second braking means are adapted to resist an unwanted movement of the screw type shaft in an opposite direction, with the no-back device being characterized in that it also includes:
- detector(s) or means for detecting the rotation status of the ratchet wheels, and
- indicator(s) or indicating means provided to supply an indication relating to the state of operation of the no-back device, according to the rotation status of the wheels.

Preferred but not limiting aspects of the no-back device according to the first aspect of the invention are as follows:
- for each wheel, the detectors or means for detecting can be adapted to determine whether the wheel is stationary or driven in rotation;
- since the ratchet wheels are in an embodiment made from ferromagnetic material, the detector(s) or detecting means can include a pair of inductive sensors, each sensor being mounted at the periphery of a ratchet wheel in such a manner that that the magnetic field induced in the sensor is sensitive to the variation of the magnetic gap between the sensor and the wheel;
- the magnetic gap varies dependent on whether the sensor is located opposite to a top of a tooth or opposite to the base of a tooth of the ratchet wheel;
- the detector(s) or detecting means can also include processor(s) or processing resources associated with the sensors and adapted to determine, for each wheel as a function of the variations of the magnetic field induced, whether the latter is stationary or driven in rotation;
- for each wheel, the detector(s) or detecting means can include movement detector(s) or means adapted to detect the movement of at least one ratchet associated with the said wheel, so that the immobility of a ratchet characterizes a stationary wheel, and that the mobility of a ratchet characterizes a wheel driven in rotation;
- the indicator(s) or indicating means can include comparison means adapted to effect a comparison between the rotation status of each of the wheels, and alert means designed to provide an indication of failure in the case where the compared rotation states are identical.

According to another aspect, the invention relates to an actuating device for a mobile element, in particular to control the flight of an aircraft, which includes an actuating device according to one possible embodiment of the first aspect of the invention.

According to yet another aspect, the invention relates to a method for determining the operational status of a no-back device, characterized in that it includes detecting the rotation status of the ratchet wheels and indicating the operational status of the no-back device as a function of the detection.

BRIEF DESCRIPTION OF THE DRAWINGS

Other characteristics, objectives and advantages of the invention will appear on reading the detailed description that follows, and with reference to the appended drawings, which are provided by way of non-limiting examples and in which:

FIG. 4 represents a view in section of a device according to a preferred embodiment of the invention.

DESCRIPTION OF PREFERRED EMBODIMENTS

The principle of operation of a conventional no-back device will now be described.

As stated previously, a role of a no-back device is to prevent the actuating screw from going into rotation under the effect of an aerodynamic load applied to the nut.

Figure 1:
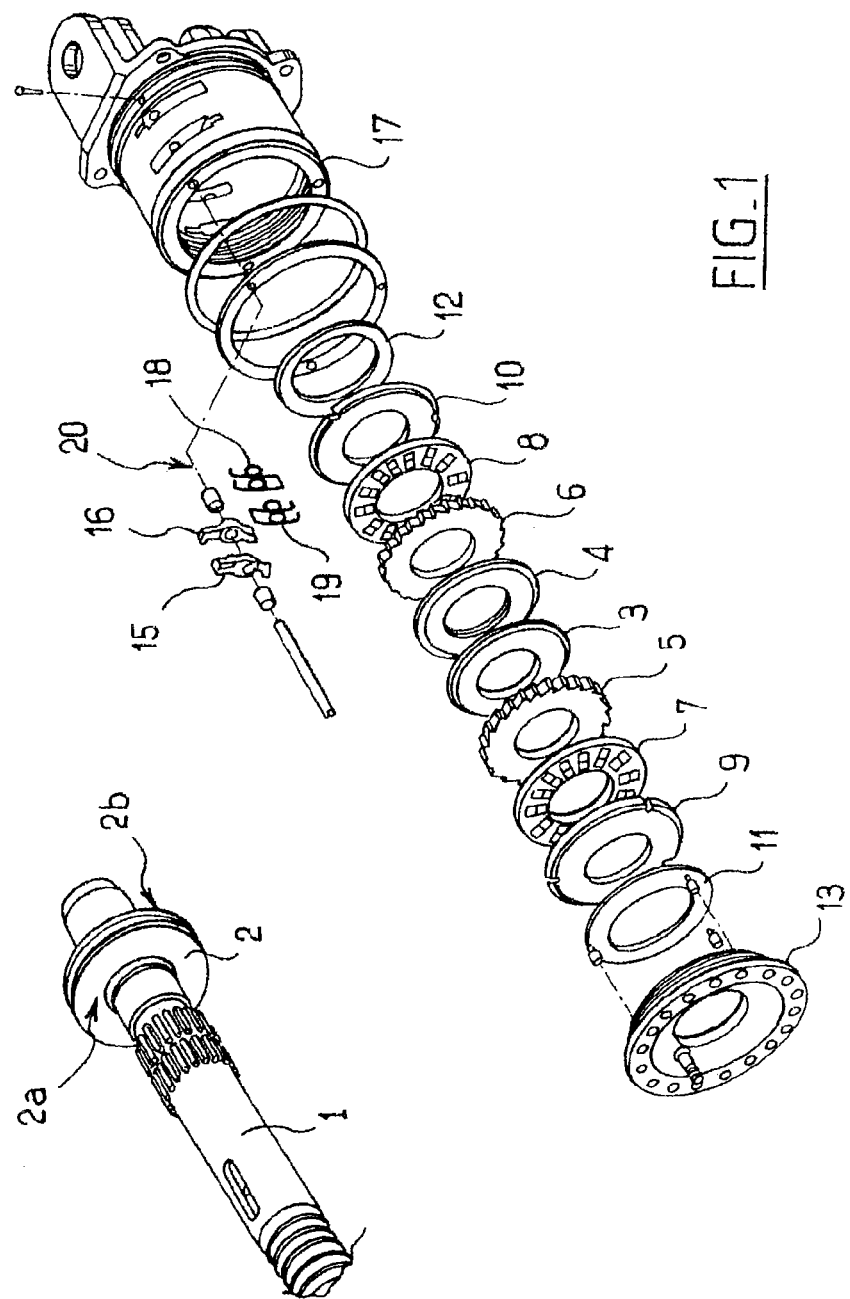
FIG. 1 represents an exploded view in perspective of a conventional no-back device, as well as a view in perspective of a shaft with an actuating screw with which the no-back device is intended to cooperate.

FIG. 1 represents an exploded view in perspective of the different parts making up a conventional no-back device, as well as a view in perspective of a screw type shaft 1 with which the no-back device is intended to cooperate.

Figure 2:
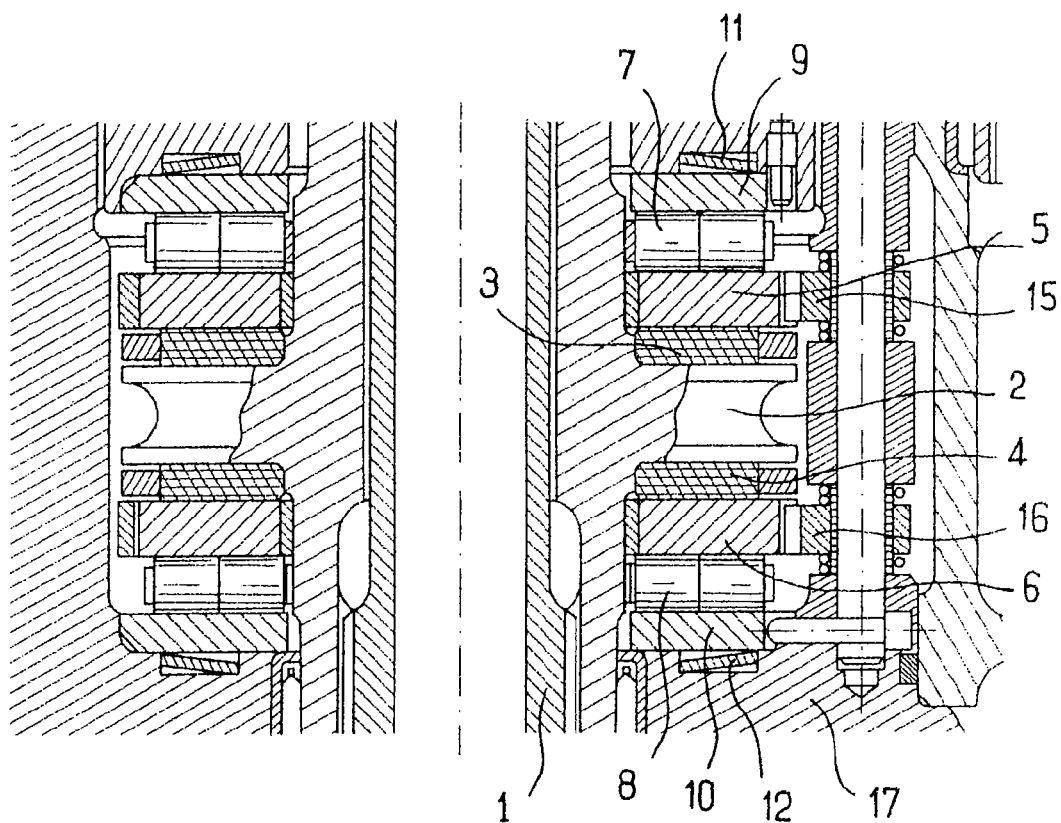
FIGS. 2 and 3 represent views in section of the conventional no-back device mounted to cooperate with a screw type actuating shaft.

FIG. 2 represents a view in section of the conventional no-back device mounted to cooperate with the screw type shaft 1.

The screw 1 is equipped with a braking element 2 mounted in order to rotate with the screw, and having the shape of a small collar extending laterally in relation to the axis of the screw, presenting lateral faces 2a and 2b, and intended to be inserted between the means forming a brake for the no-back device.

The no-back device includes a pair of brakes or brake-forming means, each of the braking means being intended to be located on either side of the brake element 2.

The no-back device is thus bi-directional in that it includes a first brake or brake-forming means designed to resist an unwanted movement of the screw type shaft in a first direction, and a second brake or brake-forming means designed to resist an unwanted movement of the screw type shaft in an opposite direction.

These brakes or braking means are configured to apply braking friction against one or other of the lateral faces 2a, 2b of the brake element 2 in response to a load in compression or in tension exerted on the screw type shaft via the nut.

Each of the brake resources includes a ratchet wheel 5 (respectively 6) bearing onto a roller thrust bearing 7 (respectively 8) arranged to be able to run in a bearing 9 (respectively 10).

A friction disk 3 (respectively 4), such as a carbon disk for example, is sandwiched between a ratchet wheel 5 (respectively 6) and an axial face 2a (respectively 2b) of the braking element 2.

The ratchet wheels can be made from a ferromagnetic material.

Pre-loading springs 11, 12 hold the aforementioned parts in contact, and these are accommodated in a container 17 which is closed off by a closure element 13.

Toothed wheel ratchets, mounted on an axle 20, are shown with the references 15 and 16. The ratchets 15, 16 are intended to fit with the teeth of a ratchet wheel 5, 6 to allow the wheel to rotate in one direction only. Springs 18, 19 are provided more precisely to press each ratchet 15, 16 against a tooth of the corresponding ratchet wheel 5, 6.

The ratchet wheels 5, 6 are furthermore mounted in opposition, meaning that the direction of rotation allowed for one wheel is opposite to the direction of rotation allowed for the other wheel.

Under the action of an axial load, the brake element 2 of the actuating screw 1 presses onto a friction disk which rests on a ratchet wheel, which itself bears onto a roller thrust bearing.

The assembly made up of the brake element, friction disk and ratchet wheel then becomes a solidary part in rotation by friction.

When the movement of the screw gives rise to the movement of the nut in the same direction as that produced by the effect of the axial load on the screw, then the ratchet wheel to which the force is applied is prevented from rotating by the ratchets which are pressed against its teeth. For its part, the other ratchet wheel rotates freely causing the ratchets associated with it to toggle.

In this case, in order to be able to actuate the mobile element, it is necessary to overcome the friction torque Cf of the no-back device (that is the rubbing torque of the brake element of the actuating screw on the friction disk), but assistance for this is provided by the torque Cc induced by the axial load.

The torque that has to be supplied to the actuating screw must be greater than the torque Cv specified by the expression Cv=Cp+Cf−Cc, or by the expression:

$$Cv = Cp + \phi Frm - \frac{Fp\eta vi}{2\pi}$$

where:
Cp represents the continuous residual torque of the no-back device,
φ is the friction coefficient,
rm is the mean radius of the friction disks,
F is the load of the nut on the actuating screw, P is the pitch of the actuating screw,
ηvi is the indirect output of the roller screw, and η is the direct output of the roller screw.

When the movement of the actuating screw gives rise to movement of the nut in the opposite direction to that produced by the effect of the axial load on the actuating screw, the ratchet wheel to which the force is applied is prevented from rotating while the other is locked.

In this case, the torque that has to be applied to the actuating screw must be sufficient to counter the torque Cc induced on the actuating screw under the effect of the axial load, to which is added the permanent residual torque Cp of the no-back device.

In order to be able to actuate the mobile element, the torque that has to be supplied to the actuating screw must be greater than the torque Cv used to overcome the load, and defined by Cv=Cp+Cc, or by $$Cv = Cp + \frac{Fxp}{2\pi x\eta}$$

When the direction of the axial load is reversed, the braking element of the actuating screw presses onto the opposite friction disk. Since the toothed wheels are mounted in opposition, the reversal of the direction of the load will therefore result in the same operating conditions as those described above.

Figure 3:
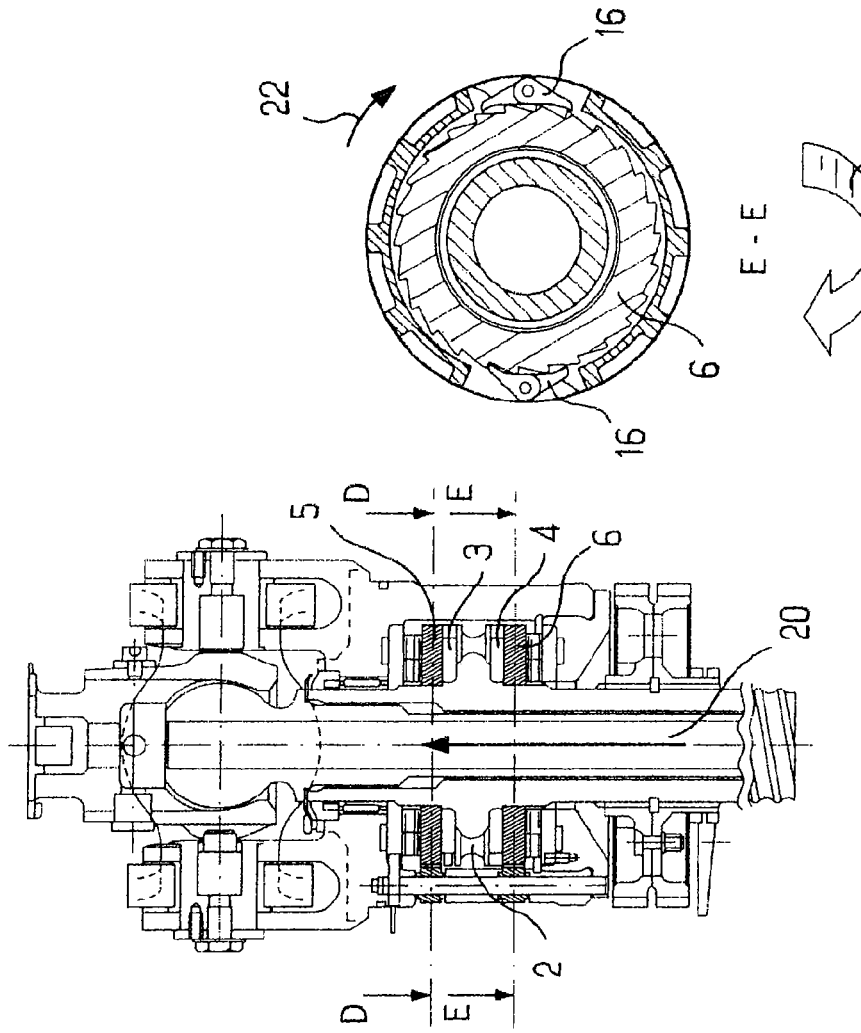

Consider for example, operation under a load in compression, as represented in FIG. 3 by the arrow referenced 20. In this figure, the same references are employed as those used in FIGS. 1 and 2.

The arrows 21 indicate the direction of rotation induced on the actuating screw by the axial load.

In this case, the upper ratchet wheel 5, represented on the left of the figure, along section D-D, is prevented from rotating by the ratchets 15, and is able to turn only in the direction indicated by the arrow 23.

The lower ratchet wheel 6, represented on the right of the figure, along section E-E, is mounted in opposition in relation to the upper ratchet wheel 5, and prevented from rotating by the ratchets 16, and can therefore turn only in the opposite direction, indicates by the arrow 22, which here is identical to the direction of rotation induced by the axial load (see arrow 21).

When the movement of the actuating screw gives rise to the movement of the nut in the direction of the load, the brake element 2 and the upper carbon disk 3 slip on the upper ratchet wheel 5, which is stationary, while the lower ratchet wheel 6 rotates.

This rotation is due to the force of the lower pre-stressing spring 12 which presses the lower ratchet wheel 6 against the lower friction disk 4 and therefore against the brake element 2.

When the movement of the actuating screw gives rise to the movement of the nut in a direction opposite to that of the load, the upper ratchet wheel 5 can rotate while the lower ratchet wheel 6 is unable to turn (the braking element 2 of the actuating screw, the lower friction disk 4 and the lower ratchet wheel 6 are solidary, by friction, in rotating under the effect of the pre-loading spring).

Finally, it will have been seen that in normal operation, there is always one ratchet wheel that rotates while the other remains stationary.

The invention proposes to make use of this property in order to allow the determination of the operational status of the no-back device, and in particular any failure of the primary function. Different causes are described below which lead to the failure of the primary function, and as a consequence to a risk that the device will function in a dormant fault mode.

By way of an example, consider a load in compression and an actuation in the direction of the load. As discussed previously, the upper ratchet wheel remains stationary while the lower ratchet wheel turns by opening the ratchets associated with it.

The rotation of the lower ratchet wheel is due to the force of the pre-stressing spring which presses the ratchet wheel against the lower friction disk and therefore against the brake element associated with the actuating screw. The braking means that include the lower wheel are thus attached, under the force of the pre-stressing spring, to the braking element, by means of a rotating friction that is characterized by the friction coefficient $\mu$.

The torque of the lower ratchet wheel is therefore proportional to the pre-load on the lower pre-stressing spring, to the mean radius of the lower friction disk, and to the friction coefficient $\mu$.

The torque to be supplied to the lower ratchet wheel in order to cause it to rotate must be greater than the torque required in order to lift the ratchets by acting against the retaining springs provided to press the ratchets against the wheel.

It can therefore be seen that it is necessary to have an adequate friction coefficient, greater than a given friction coefficient (which in particular is a function of the pressure applied by the retaining springs of the ratchets), so that the ratchet wheel is able to lift the ratchets and therefore rotate.

From this point, in the event of a reduction in the friction force, it can happen that the torque supplied to the ratchet wheel is insufficient to allow the ratchets to lift, and the ratchet wheel therefore cannot rotate.

In case of failure associated with wear on the friction disk, the play between the brake element of the actuating screw and the disk increases, the pre-load on the pre-stressing spring reduces, and the torque supplied to the lower ratchet wheel can be less than the minimum torque needed to lift the ratchets and to allow rotation.

In both of the above-mentioned cases, the two ratchet wheels are then stationary, and the no-back device has failed.

Another type of failure that can arise, is a failure on the part the ratchets, responsible for the unidirectional operation of one of the ratchet wheels, to engage.

As previously described, consider a load in compression and an actuation in the direction of the load. Rotation of the upper ratchet wheel is prevented due to the action of the ratchets associated with this wheel. However, if these ratchets should fail, or if the axle or the teeth on the wheel should break, then rotation of the upper wheel cannot be prevented. The two wheels then rotate at the same time.

The following table summarizes the rotation status of the ratchet wheels under the effect of a load in compression, as a function of the types of failure presented above.

| Type of failure | | Actuating mode | |
|---|---|---|---|
| | | Actuated in the direction of the load | Actuated in the direction opposite to the load |
| None | Upper ratchet wheel | Fixed | Rotating |
| | Lower ratchet wheel | Rotating | Fixed |
| Loss of friction on the side of the lower ratchet wheel | Upper ratchet wheel | Fixed | Rotating |
| | Lower ratchet wheel | Fixed | Fixed |
| Loss of friction on the side of the upper ratchet wheel | Upper ratchet wheel | Rotating | Rotating |
| | Lower ratchet wheel | Rotating | Fixed |

As has been seen previously, in fault mode, it can happen that the two wheels rotate simultaneously, or indeed that they are both stationary, while in normal operating mode, one wheel turns while the other remains stationary.

The no-back device of the invention is similar to a conventional no-back device of the type described above, except that it also includes detector(s) or means for detecting the rotation status of the ratchet wheels, and indicator(s) or indicating means provided to supply an indication relating to the operational status of the no-back device as a function of the detected rotation status of the wheels.

The detector(s) or means for detecting the state of rotation of the ratchet wheels are more precisely designed to determine, for each wheel, whether the latter is stationary or in rotation.

The detection effected by the detector(s) or detecting means is used by the indicator(s) or indicating means to supply an indication relating to the operational status of the no-back device. More precisely the indicator(s) or indicating means include comparison means that are designed to effect a comparison of the state of rotation of each of the wheels, and alert means designed to provide an indication of failure in the case where the compared rotation states are identical.

According to a preferred method of implementation of the invention, illustrated in FIG. 4, the detector(s) or detection means include two inductive sensors, each sensor 25, 26 being associated with a ratchet wheel 5, 6, made from a ferromagnetic material.

More precisely, each sensor 25, 26 is incorporated into the no-back device at the periphery of the ratchet wheel 5, 6 with which it is associated, in the plane formed by the ratchet wheel so as to extend radially in relation to the axle of the actuating screw.

The view in section of the ratchet wheel 6 and of the sensor 26, on the right in FIG. 4, represents this arrangement more precisely.

Each inductive sensor emits a magnetic field produced by a permanent magnet which traverses a coil. Since the ratchet wheel is made from a ferromagnetic material, when it passes in front of the inductive sensor associated with it, a voltage is generated in the coil, which is directly proportional to the variations in the flux.

The magnetic field is sensitive in particular to the variations in the magnetic gap between the sensor and the ratchet wheel. When the sensor is opposite to the top of a tooth on the wheel, the magnetic field induces a current in the coils. When the sensor is opposite to the base of a tooth, the resistance increases, and this disturbs the magnetic field.

Observation of the variations in the magnetic field allows the rotation status of the sprocket wheel to be characterized. In particular, the magnetic field induced is constant when the wheel is fixed, while it varies according to variations in the magnetic gap when the wheel is driven in rotation.

The detector(s) or means for detecting the rotation status of the sprocket wheels also include processor(s) or processing resources associated with the sensors so as to determine, for each wheel, as a function of the variations in the magnetic field induced, whether the latter is stationary or driven in rotation.

Naturally the invention is not limited in any way to the use of inductive sensors, since other types of sensors can be employed in order to detect the rotation status of the sprocket wheels. Furthermore the invention is not limited to observation of the wheels themselves, but rather extends to observation of all the parts associated with a wheel (in particular the ratchets or ratchet retaining springs) that are caused to adopt a different state according to whether the wheel is fixed or driven in rotation.

According to another possible embodiment of the invention, the detector(s) or detecting means can be designed to detect the movements of one or more ratchets associated with a wheel. A stationary ratchet characterizes a fixed wheel, while a mobile ratchet characterizes a wheel driven in rotation.

In addition, the indicator(s) or indicating means can also be provided to supply information, as a function of the state of rotation of the wheels, that is used to characterize any failure of the no-back device. By way of an example, and with reference to the table provided above, it is possible, in case of a load in compression, to deduce a loss of friction on the side of the lower wheel, when the detection resources detect that both wheels are fixed. In a similar manner, in the case of a load in compression, it is possible to detect a failure of the ratchets of the upper wheel to engage, when the detection resources detect that both wheels are in rotation.

According to another aspect, the invention also relates to a method for determining the operational status of a no-back device by detecting the rotation status of the ratchet wheels as described above, and indicating the operational status of the no-back device as a function of the detection.

The invention claimed is:

1. A no-back device for an actuating device for a mobile actuating element with a screw type actuating shaft, the no-back device comprising:

first (3, 5, 7, 9, 11, 15, 19) and second (4, 6, 8, 10, 12, 16, 18) brakes, each having a ratchet wheel (5, 6), the ratchet wheels mounted in opposition to each other with the first brake designed to resist an unwanted movement of the shaft in a first direction, and the second brake designed to resist an unwanted movement of the shaft in an opposite direction, a processor associated with sensors and designed to determine the state of rotation of each wheel, wherein the state of rotation indicates whether the wheel is stationary or driven in rotation, and indicating means to supply an indication relating to the operational state of the no-back device, the indicating means including means for comparing the state of rotation of each of the wheels as determined by the processor, and alert means for supplying an indication of failure when the compared rotation states are identical.

2. A device according to claim 1, wherein the ratchet wheels comprise a ferromagnetic material, and the sensors are a pair of inductive sensors (25, 26), with each sensor located on a periphery of a ratchet wheel (5, 6) with a magnetic field induced in the sensor sensitive to variation in a magnetic gap between the sensor and the wheel.

3. A device according to claim 2, wherein each sensor is located so that the magnetic gap varies dependent on the sensor being located opposite to a top of a tooth or opposite to a base of a tooth of the sprocket wheel.

4. A device according to claim 2, wherein the processor determines, for each wheel, whether the wheel is stationary or driven in rotation as a function of variations of the induced magnetic field in the sensor associated with the wheel.

5. A device according to claim 1, wherein the indicating means also supply information that can be used to characterize a failure of the no-back device.

6. An actuating device for a mobile element, comprising a no-back device according to claim 1.

7. The actuating device of claim 6 effective to control flight of an aircraft.

8. A method for determining an operational state of a no-back device for an actuating device for a mobile element in an aircraft, which has a screw type actuating shaft, where the no-back device includes first (3, 5, 7, 9, 11, 15 19) and second (4, 6, 8, 10, 12, 16, 18) brakes, each of which has a ratchet wheel (5, 6), the ratchet wheels mounted in opposition to each other with the first brake designed to resist an unwanted movement of the shaft in a first direction, and the second brake designed to resist an unwanted movement of the shaft in an opposite direction, the method comprising:

detecting a rotation state for the ratchet wheels with a processor associated with sensors, and indicating an operational state of the no-back device as a function of the said detecting, wherein said indicating step comprises comparing the rotational state of each of the wheels as determined by the processor and supplying an indication of failure in the case where the compared states are identical.

* * * * *